April 19, 1932. B. C. CARTER 1,854,329
AIR SCREW DRIVE
Filed March 21, 1928  4 Sheets-Sheet 1

B. C. Carter
INVENTOR
By: Marks & Clark
Attys.

April 19, 1932.  B. C. CARTER  1,854,329
AIR SCREW DRIVE
Filed March 21, 1928  4 Sheets-Sheet 2
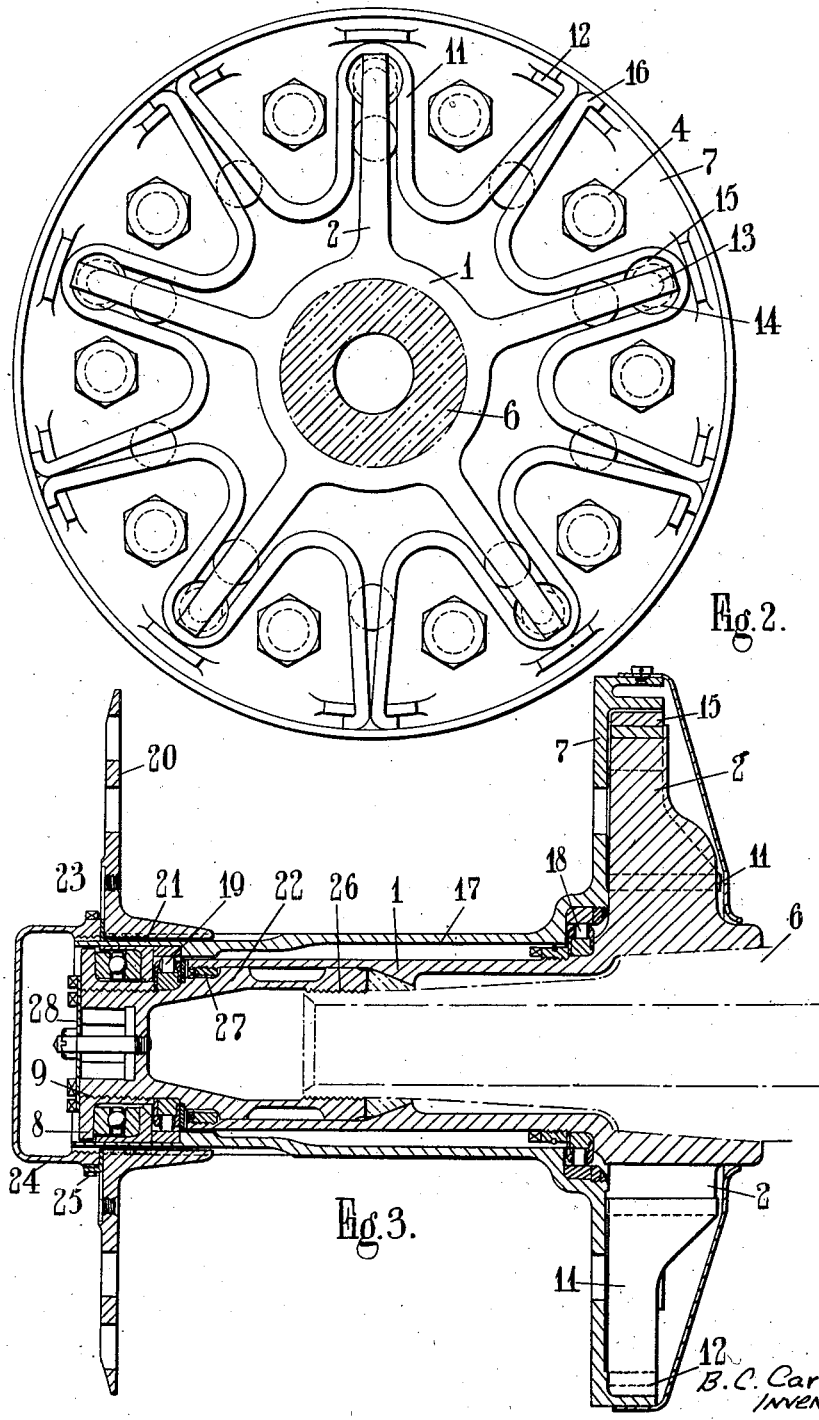

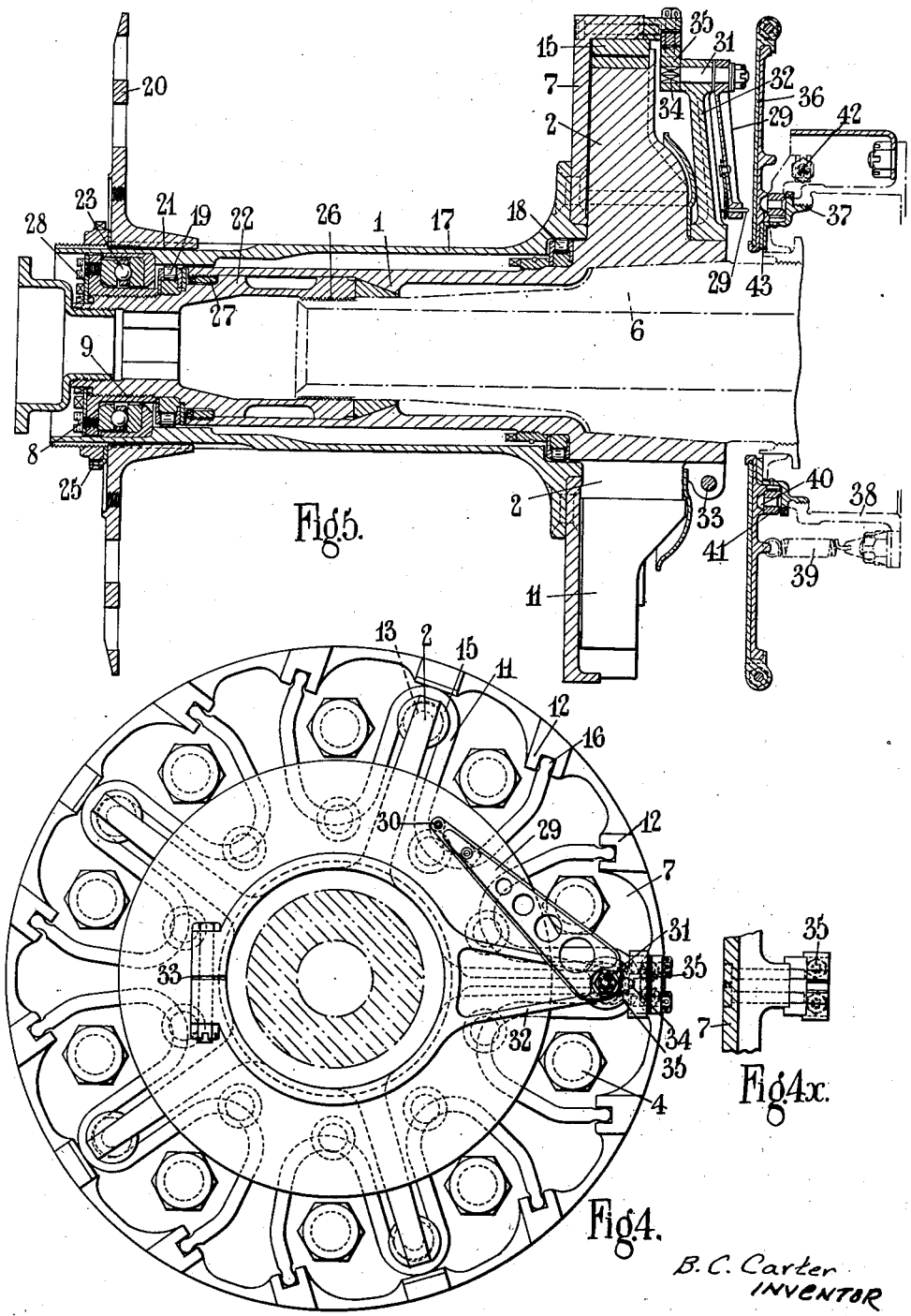

April 19, 1932.  B. C. CARTER  1,854,329
AIR SCREW DRIVE
Filed March 21, 1928  4 Sheets-Sheet 4

B. C. Carter
INVENTOR

By: Marks & Clerk
Attys

Patented Apr. 19, 1932

1,854,329

UNITED STATES PATENT OFFICE

BENJAMIN CHARLES CARTER, OF SOUTH FARNBOROUGH, HAMPSHIRE, ENGLAND

AIR-SCREW DRIVE

Application filed March 21, 1928, Serial No. 263,521, and in Great Britain March 26, 1927.

This invention relates to aircraft and the like engines for driving airscrews, and more particularly to the drive or connection between the first crank of the crankshaft of the engine and the boss or centre of the airscrew. The word crankshaft is herein intended where the context so permits to include the crankshaft and/or airscrew shaft.

In general, the airscrew of an aircraft engine functions as a flywheel of large inertia and the crankshaft system has a number of modes of natural torsional vibration in relation to the airscrew. For a first approximation each crank throw with a certain portion of the moving mass associated with it may be taken as equivalent to an additional flywheel, and the number of modes of natural torsional vibration is equal to the number of crank throws if driven auxiliaries be disregarded. The simplest mode of torsional vibration is the single node one. This has the lowest natural frequency and the condition which is most to be avoided is that where the frequency of the main engine impulses is equal to this lowest natural frequency of the crankshaft-airscrew system in or near the speed region corresponding to full throttle operation.

Let it be considered that the crankshaft is made of sufficient stiffness to place the engine speed at which the two frequencies (i. e. the frequency of the main engine impulses and the lowest natural frequency of the crankshaft) would be equal beyond the maximum running speed, with a speed margin such that the amplifying effect of resonance may not be unduly great at full speed. The engine speed at which the two frequencies would be equal is hereinafter termed the "main synchronous speed". Designing on this basis has the disadvantage that amplifying resonance effects are reduced rather than eliminated and moreover a moderate degree of slackness in the attachment of the hub to the crankshaft or of the airscrew to the hub may bring down the main synchronous speed to a value in or harmfully near the speed region of full torque running. A further disadvantage is that harmonics of the main engine impulses synchronize with the lowest natural frequency of the system in the running speed range, at $\frac{1}{2}$, $\frac{1}{3}$, $\frac{1}{4}$, etc., of the main synchronous speed.

An alternative basis of design is to make the crankshaft stiffness low enough to bring the main synchronous speed in to a low speed, low throttle region of operation. Then the harmonics of the main engine impulses resonate with the lowest natural frequency at still lower speeds and smaller throttle openings.

In each case there is a likelihood of it being necessary to compromise the engine design to obtain the desired characteristics of crankshaft system.

The present invention has for its main object, to provide simple means whereby torsional resonance in the drive from the crankshaft to the airscrew may be conveniently set or controlled to avoid harmful effects and under certain conditions utilized to advantage to reduce the periodic variation of torque and stress in the drive. Another object is to reduce danger arising from sudden crankshaft seizure. Yet another object is to provide means for recording torsional vibration and the mean torque transmitted, and/or for recording thrust.

According to the present invention, in an engine-airscrew drive, flexible or resilient driving means of suitable flexibility are employed arranged at the end or ends of the airscrew boss, in the crankcase nose or in other convenient position. The driving means may be provided by suitably constructing the airscrew hub flange or flanges or otherwise. The flexibility provided is such as to cause the torsional resonance effects to occur at suitable engine speeds. A suitable flexibility may be indicated in general terms by stating that it should be between $1/\sqrt{n}$ to $8/\sqrt{n}$ times the torsional flexibility of the system from the airscrew to the centre of the crank pin most remote from the airscrew, when coupled as ordinarily, the quantity "$n$" in the foregoing expressions denoting the number of crank throws.

Further according to the present invention, in an engine-airscrew drive, the supporting member or hub of the airscrew is constructed with driving members integral with the hub centre and located at the end or ends of the airscrew boss, the driving members being of such a degree of flexibility or resiliency that the main synchronous speed of the engine with the airscrew attached (which synchronous speed is dependent upon the torsional stiffness of the connection between the airscrew and the first crank of the crankshaft) is well below the normal or cruising speed of the engine, i. e. is in a low speed region, or the driving members being of less flexibility and arranged to drive the hub through other members of less flexibility to obtain the desired total flexibility above described.

By means of such a hub the torsional stiffness of the connection between the first crank of the crankshaft and the airscrew can be set without altering the crankshaft design, and as this stiffness is a controlling feature in fixing the frequencies of natural torsional vibration of the engine-airscrew system the improved hub provides means whereby torsional resonance effects may be controlled to reduce or obviate harmful effects and whereby beneficial effects may be provided.

Let the simple case be considered of a single throw type of radial engine in which the crank is stiff relatively to the airscrew shaft. The influence of torsional resonance upon the crankshaft stresses under any condition of running may be determined if what may be termed the "resonance factor" is known, i. e. the ratio of the amplitude of torque variation in the crankshaft to the amplitude of the harmonic forming gas torque. Let $x$ denote the ratio of the running speed to the main synchronous speed. At the main synchronous speed, i. e. when $x=1$, the effect of resonance is to bring about a torque variation in the crankshaft and drive some 5 to 10 times the gas torque variation. The resonance factor is greater than unity for all values of $x$ up to about $$x = \sqrt{2},$$

but for greater values of $x$ the resonance factor is less than unity and then resonance has the effect of reducing the torque variation. Thus if $x$ be 2 the resonance factor is somewhat less than ⅓ and if $x$ be 3 the resonance factor is somewhat less than ⅛. If, for example, the hub or driving means stiffness in torsion be made ⅓ of the crankshaft stiffness the main synchronous speed is reduced to ½ of that with a rigid drive hub, and if with the rigid hub the main synchronous speed be at a full throttle speed the fitting of a hub of the stiffness in question according to the present invention will make the value of $x=2$ at this speed and the resonance factor less than ⅓. In the foregoing "crankshaft stiffness" is meant to define the torque required to produce unit angular movement about the crankshaft axis between the crankpin centre and the place of attachment of the hub to the crankshaft. Theory indicates that by fitting the improved hub the torque variation in the crankshaft and drive at what was originally the main synchronous speed may be reduced from the value of some 5 to 10 times the gas torque variation to a value less than one third of the gas torque variation. A more flexible hub would make the main synchronous speed still lower but the amount of angular movement corresponding to the mean torque and hub weight would become undesirably great when a certain flexibility is exceeded. In single throw radial engines where the crank is not stiff relatively to the airscrew shaft the system may vibrate with two or more nodes, and in fitting an airscrew drive according to the invention to such engines the flexibility adopted requires to be such as to influence the several resonance speeds in such manner as to avoid harmful effects.

In the case of multi-crank engines, the resonance factor has a number of peak values corresponding to the several possible modes of vibration and the flexibility of the crankshaft plus the flexibility of the hub is preferably made within such a range of values as to avoid peaks except under low throttle conditions.

The invention may be applied to existing designs of engines by replacing the standard hub by the improved hub having driving members of suitable design and flexibility. In preparing new designs of engines the difficulties of combining suitable crankshaft stiffness with other requirements of design may be minimized or eliminated by arranging that a suitable degree of flexibility is provided in the driving members of the hub or between two separate parts of the airscrew drive within the crankcase nose.

The invention is illustrated by way of example in the accompanying drawings, in which:—

Figure 2 is an end view, partly in section, of another form of construction of flexible drive;

Figure 3 is a longitudinal section of Figure 2;

Figure 4 is an end view partly in section, of another form of construction of flexible drive and showing means for recording relative angular movements between parts of the drive from which corresponding values of transmitted torque may be determined;

Figure 6:
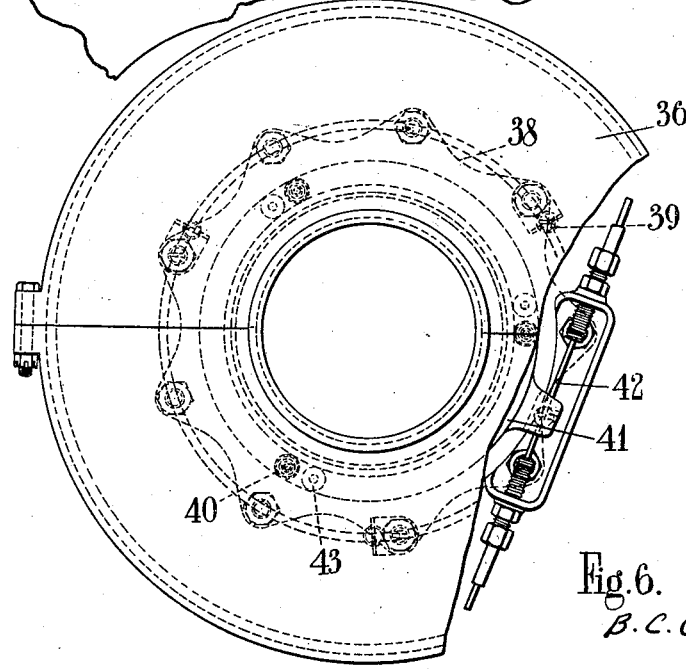
Figure 8:
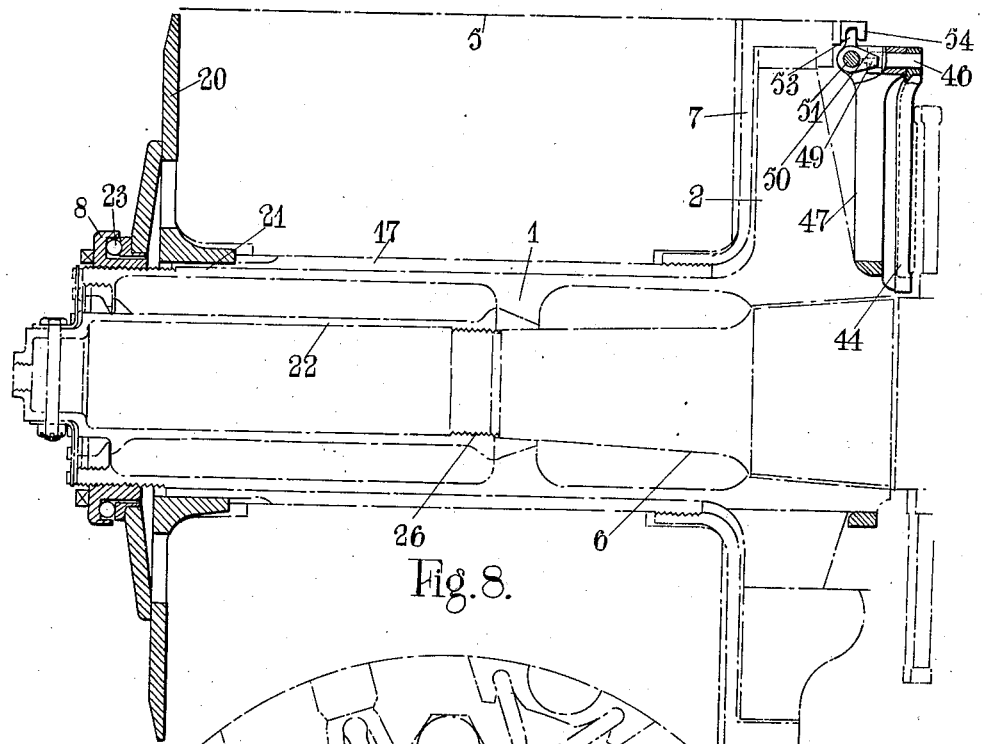
Figure 7:
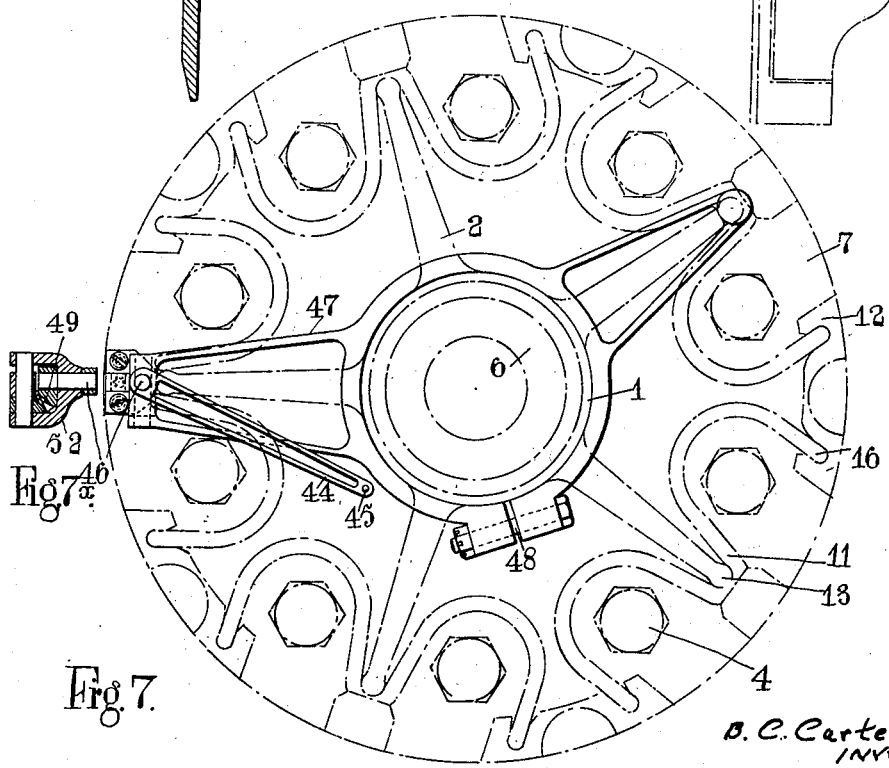

Figure 4$^x$ is a view of a detail in Figure 4;

Figure 5 is a longitudinal section of Figure 4;

Figure 6 is an end view at right angles to Figure 5, parts being omitted;

Figure 7 is an end view, parts being omitted, of another form of construction of flexible drive and showing means for recording relative angular movements as above mentioned and thrust;

Figure 7× is a view of a detail in Figure 7;

Figure 8 is a longitudinal section of Figure 7.

In the arrangements according to the invention illustrated in the drawings, the or each driving flange at the end of the hub 1 upon which the airscrew is mounted is formed with or as driving arms or spokes 2 extending from the central body of the hub.

Figure 1:
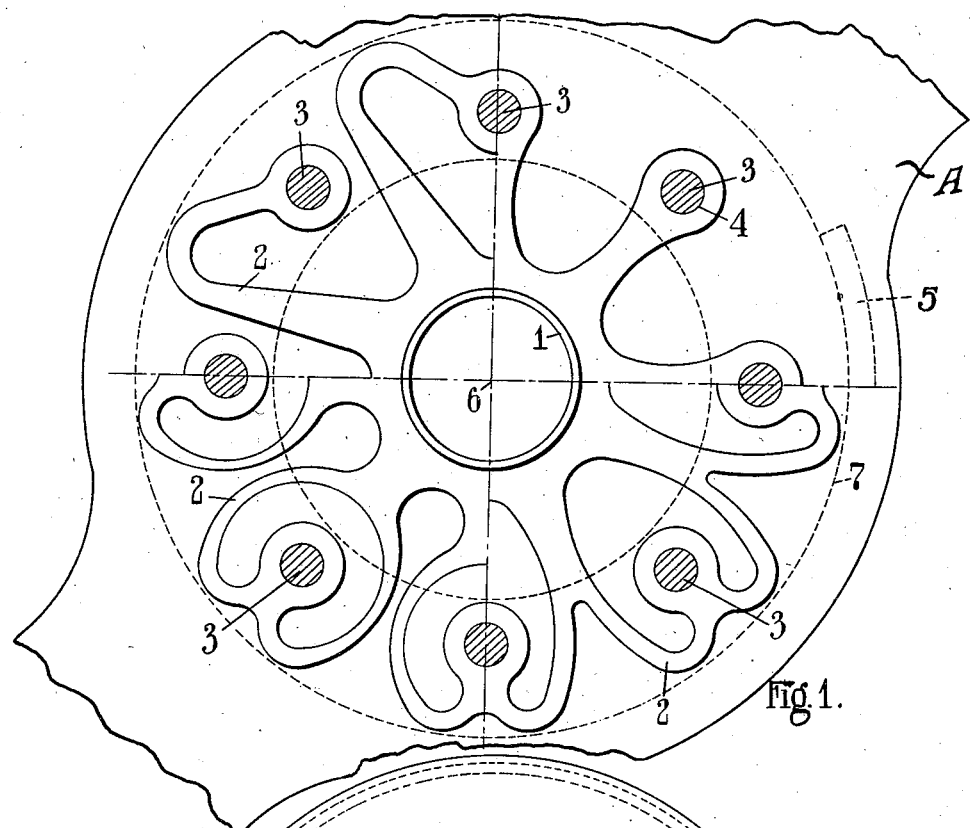
Figure 1 is an end view showing in each quadrant of a circle a different form of flexible driving member arranged at one end of an airscrew boss integral with the centre of an airscrew hub.

In the constructions shown in Figure 1, the arms extend outwards to positions where they are formed with bolt holes 3 for the bolts 4 for securing the hub to the boss 5 of the airscrew. In the constructions shown in the other figures the arms extend outwards to positions where they are indirectly connected to the boss of the airscrew.

The arms or the like (hereinafter referred to as arms) may (as shown in Figure 1) be so proportioned and of such length and form that the requisite strength is obtained in conjunction with the requisite torsional resiliency in the transmission of torque from the crankshaft or airscrew shaft 6 to the airscrew, the construction being such that the deflection of the bolt holes is mainly tangential to the circle in which the bolt hole centres are located. The cross section of the arms may be rectangular, but any other cross section such as circular, H or I form may be adopted and, although in the preferred arrangement the arms lie in one plane normal to the air-screw axis of rotation and yield under transmitted torque by bending and shearing elastically in this plane, they need not lie entirely in such a plane but may sweep out any curve in three dimensions and yield tangentially largely by twisting. The airscrew fixing bolts 4 may clamp the arms directly to the airscrew boss or centre, but where the boss is not of metal it is desirable to interpose metal washers concentric with the bolts, or an annular metal plate 7 concentric with the hub to distribute the bolt pressure over an adequate area of the boss or centre part of the airscrew to obtain and maintain sufficient frictional grip for the drive.

The arms may extend out beyond the circle of the bolt hole centres and curve back to the bolt holes as shown in the two lower and left-hand upper quadrants in Figure 1, which, as aforesaid, illustrates a different construction of arm in each quadrant of the circle. The arm or arms for each bolt may be distinct from those for other bolts as shown in the two upper and the left-hand lower quadrants in Figure 1, or may form part of a continuous tracery or meshwork of arms as shown in the lower right-hand quadrant in Figure 1. The arm thickness parallel to the airscrew axis may vary with the distance from the axis and in such a maner as to ensure, inter alia, an adequately robust support for the airscrew against gyroscopic and other forces tending to change the plane of rotation of the airscrew relative to the axis of rotation of the crankshaft and against part or all of the airscrew tractive or thrust effort.

In a modified arrangement the arm ends may be tightly bolted or riveted to an annular metal plate or plates, such as 7, or pivoted on pegs, bolts or rivets secured thereto, the plate or plates being separately bolted to the boss or centre part of the airscrew.

In a further modification the arms may be connected at their outer ends.

The arms may have such a fit on the bolts or pivots as to permit relative rotary or angular movement therebetween to allow of flexure of the arms. It will be understood that to permit this action there is preferably only one circle of bolt holes or the like centres at one or each end of the airscrew boss.

Friction between the relatively moving parts of the bolt holes and the bolts or the like may be arranged to give a vibration damping action if desired.

With some aircraft engines and installations with existing hubs, there is a danger that in the event of sudden arrest of the crankshaft owing to engine failure or damage from enemy action the crankshaft portion between the thrust race on the engine and the airscrew will twist off owing to the high momentum of the airscrew, and the airscrew and hub will come adrift or the engine may be wrenched from its mounting. To obviate this possibility in the present arrangement, the torsion strength of the driving arms or the like in the sense opposite to that of the normal drive may be made less than that of the crankshaft, the airscrew or the engine mounting, but greater than that required for windmilling, i. e. driving the engine by the airscrew in a dive. With this arrangement in the event of sudden crankshaft arrest, the airscrew frees itself from its drive without putting excessive torque on the crankshaft, the airscrew, or the mounting, and is retained on the hub by a nut 8 (Figure 3) which engages a screwthread 9 on the hub or other convenient part.

To facilitate the complete freeing of the airscrew from the arms cutting or bending members may be attached to the plate or plates secured to the airscrew boss when these are employed for cutting or bending the arms as relative rotation of the airscrew boss and the arms takes place.

To prevent binding owing to clamping action between the washers or the annular plates and the bolt heads or bolt nuts, the washers or the annular plates may be formed with bolt hole bosses projecting through the arms and of sufficient axial length to allow relative angular movement between the bosses and the arms without allowing end play. An additional washer may be interposed between the free end of the boss and the bolt head or bolt nut.

In another arrangement according to the invention as shown in Figures 2 to 8, the driving flange of the hub is formed with arms 2 which may be rigid or flexible and engage flexible or resilient members 11, which in turn engage abutments 12 on the airscrew boss 5. The arms may consist of radial spokes, which at their outer ends 13 engage recesses 14 in resilient members 11 of the general form of a U or a double U having more or less straight or curved limbs. For example, the arms may engage the midlength portion of double U-shaped resilient members by means of radially slotted collars 15 (Figures 2 and 4) or may directly engage the resilient members as shown in Figure 7. The ends 16 of the resilient members may engage abutments 12 on an annular plate 7 clamped to the side of the airscrew boss (Figures 2, 4, 7). Alternatively, the ends of the double U-shaped resilient members may engage bolts or pivots at the side of the airscrew boss. The bolts may be the airscrew boss clamping bolts. The line joining the two abutments for each resilient member preferably passes through the point of engagement between the respective driving arm and the resilient member, and is normal to the radius of the driving arm. The engagement between the ends of each resilient member and its abutments on the annular plate at the end of the airscrew boss is such that in operation, using, for example, a double U resilient member, one half length of the latter is compressed in transmitting the drive, and the other half length is extended in so doing.

When an annular plate is used at the side of the airscrew boss, it may be extended in cylindrical form, as at 17, (Figures 3, 5, 8) within the hollow portion of the airscrew boss 5, the cylindrical portion being mounted on the airscrew hub in the arrangement of a bearing on the hub. The bearing may comprise two rings of antifriction rollers 18, 19 located between the boss 5 and the hub 1. Plain bearing surfaces may be provided in some cases. A removable flange 20 may be splined, as at 21, on to the cylindrical extension 17 of the annular plate at the opposite end of the hub to that where the driving arms are located. In this arrangement, the airscrew boss is clamped between the annular plate 7 and the removable flange 20, by the airscrew boss clamping bolts 4, or in other convenient manner. The airscrew boss clamped on the cylindrical portion of the annular plate is located on the airscrew hub by a central nut 8 on the airscrew hub or airscrew shaft or on an extension 22 secured to the hub and the shaft. A hardened washer, or a thrust bearing 23, may be interposed between the nut and the airscrew boss or the removable flange splined on the cylindrical portion of the annular plate. 24 is an axle cap screwed on the end of the cylindrical extension 17 and locked by a washer 25 keyed on the extension.

The extension 22 screws on to the shaft 6, as at 26, and is secured inside the hub 1 by means of a lock ring 27. The nut 8 is locked on the extension 22 by means of a lock ring 28. After removal of the nut 8, the extension 22, when unscrewed from the shaft 6, serves to extract or withdraw the hub 1 from the shaft 6.

In another arrangement according to the invention, the or each driving flange of the hub is formed with radial arms or spokes which engage recesses in a flange on an annular plate or plates clamped to the end or ends of the airscrew boss. In this arrangement, the radial arms or spokes are constructed with the required resiliency or flexibility as hereinbefore described.

In using the improved airscrew hub for recording torsional vibration and torque transmitted, relative movement of the airscrew and the crankshaft or airscrew shaft due to the flexibility of the arms can be multiplied by a system of levers or other gear connected to a recording stylus moving over a plate or cylinder such as used in other types of dynamometer. Instead of a stylus an insulated sparking point may be used and records obtained by sparking through paper to a metal plate, the paper having perforations made by the sparks.

One arrangement of means for recording torsional vibration is illustrated in Figures 4 to 6. As shown, a lever 29 carrying a recording stylus 30 at one end is fulcrumed at the other end, as at 31, on a radius arm 32, clamped as at 33 on to the hub 1. The lever is fixed to a tooth 34 which meshes with teeth 35 fixed to the annular plate 7. The recording stylus is located facing a record plate 36, which is slidably mounted on a support 37 on the engine crankcase 38. The record plate is normally kept clear of the stylus by means of springs 39, but may be moved into engagement with the stylus when a record is required. This engagement may be effected by means of heads 40 carried on a ring 41 mounted on the engine crankcase 38 and rotatable in both directions by means of Bowden control mechanism 42. The heads 40 normally engage recesses 43 on the back of the record plate, but when the plate is rotated the heads 40 move out of the recesses and force the record plate against the stylus. When a record is required the plate is brought into contact with the stylus and relative torsional movement between the airscrew boss and the hub causes the tooth 34 to turn the lever 29 and move the stylus over the record plate.

One arrangement of means for recording thrust is illustrated in Figures 7 and 8. As shown, a lever 44 carrying a recording stylus 45 at one end is fulcrumed at the other end as at 46 on a radius arm 47 clamped as at 48 on to the hub 1. The lever fulcrum pin is fixed to a bevel tooth 49 which meshes with two bevel teeth 50 on a spindle 51 rotatably mounted in a bracket 52 fast on the annular plate 7. The spindle 51 also carries a tooth 53 which engages teeth 54 fast to the airscrew boss 5. The record plate is normally kept clear of the stylus and may be brought into engagement therewith in a similar manner to that described with reference to Figures 4 to 6. When a record is required the plate is brought into contact with the stylus and relative thrust movement between the airscrew boss and the hub causes the tooth 54 to turn the spindle 51, which through the bevel teeth oscillates the lever 44 and moves the stylus 45 over the record plate.

Having now described my invention, what I claim as new and desire to secure by Letters Patent is:—

1. In an engine air screw drive, the combination with a driving shaft, of a hub fitted thereon and having radial arms, a plate, a cylindrical extension carried by the plate, resilient U-shaped members connected with the plate and with the arms, and means for securing the boss of the air screw upon the extension.

2. A coupling between an air screw and driving shaft, formed of resilient arms each comprising a single member secured at its inner end to a hub which is attached to the shaft and at its outer end to the air screw boss.

3. A coupling between an air screw and driving shaft, formed of resilient arms each comprising a single member, extending radially from the air screw axis secured at its inner end to a hub which is attached to the shaft and at its outer end to the air screw boss.

4. A coupling between an air screw and driving shaft, formed of resilient arms each comprising a single member secured at its inner end to the hub which is attached to the shaft and at its outer end to the air screw boss the flexibility of said arms being so designed that the natural frequency of the system is removed from the normal working frequency range of the engine.

5. A coupling according to claim 4 wherein the natural frequency of the system is arranged, by suitable design of flexibility of the arms, to be substantially equal to the frequency of the engine at low speed with small throttle openings.

6. A coupling as claimed in claim 4 wherein the flexibility of the said arms has a value lying between $\sqrt{n}$ and $8\sqrt{n}$ times the torsional flexibility of the system, including the air screw, from the centre of the crank pin most remote from the air screw if coupled without the use of said flexible means, $n$ being the number of cranks in the shaft.

7. A coupling according to claim 2 wherein the said arms are designed to be of such flexibility that in the full throttle speed region the ratio of the amplitude of torgue variation in the crank shaft, due to natural torsional vibration, to the amplitude of the gas torque is less than unity.

In testimony whereof I have signed my name to this specification.

BENJAMIN CHARLES CARTER.